United States Patent Office 3,484,196
Patented Dec. 16, 1969

3,484,196
PROCESS FOR TREATMENT OF COAL SCHISTS FOR RECOVERY OF CONTAINED ALUMINUM, IRON AND POTASSIUM
Joseph Cohen, Gardanne, and Pierre Duhart and Pierre Maurel, Aix-en-Provence, France, assignors to Pechiney-Compagnie de Produits Chimiques et Electrometallurgiques, Paris, France
Filed Mar. 29, 1967, Ser. No. 626,813
Claims priority, application France, Apr. 4, 1968, 56,337, 56,338
Int. Cl. C01g 49/14
U.S. Cl. 23—123
20 Claims

ABSTRACT OF THE DISCLOSURE

The invention is addressed to a process for the treatment of coal schists in comprising treatment of the schists in finely divided form with an excess of hot concentrated aqueous sulphuric acid and discarding the solid phase while treating the liquid phase with an aqueous solution of ethanol to precipitate the sulphates of aluminum, iron and potassium. The latter are redissolved at elevated temperature in a concentrated aqueous solution of sulphuric acid which is cooled to precipitate an acid sulphate low in aluminum and then concentrating the filtrate to crystallize aluminum sulphate and further concentrating the liquor to crystallize the sulphates of iron and potassium which are calcined to produce the iron in the form of the oxide and the potassium in the form of a sulphate.

---

Figure 1:
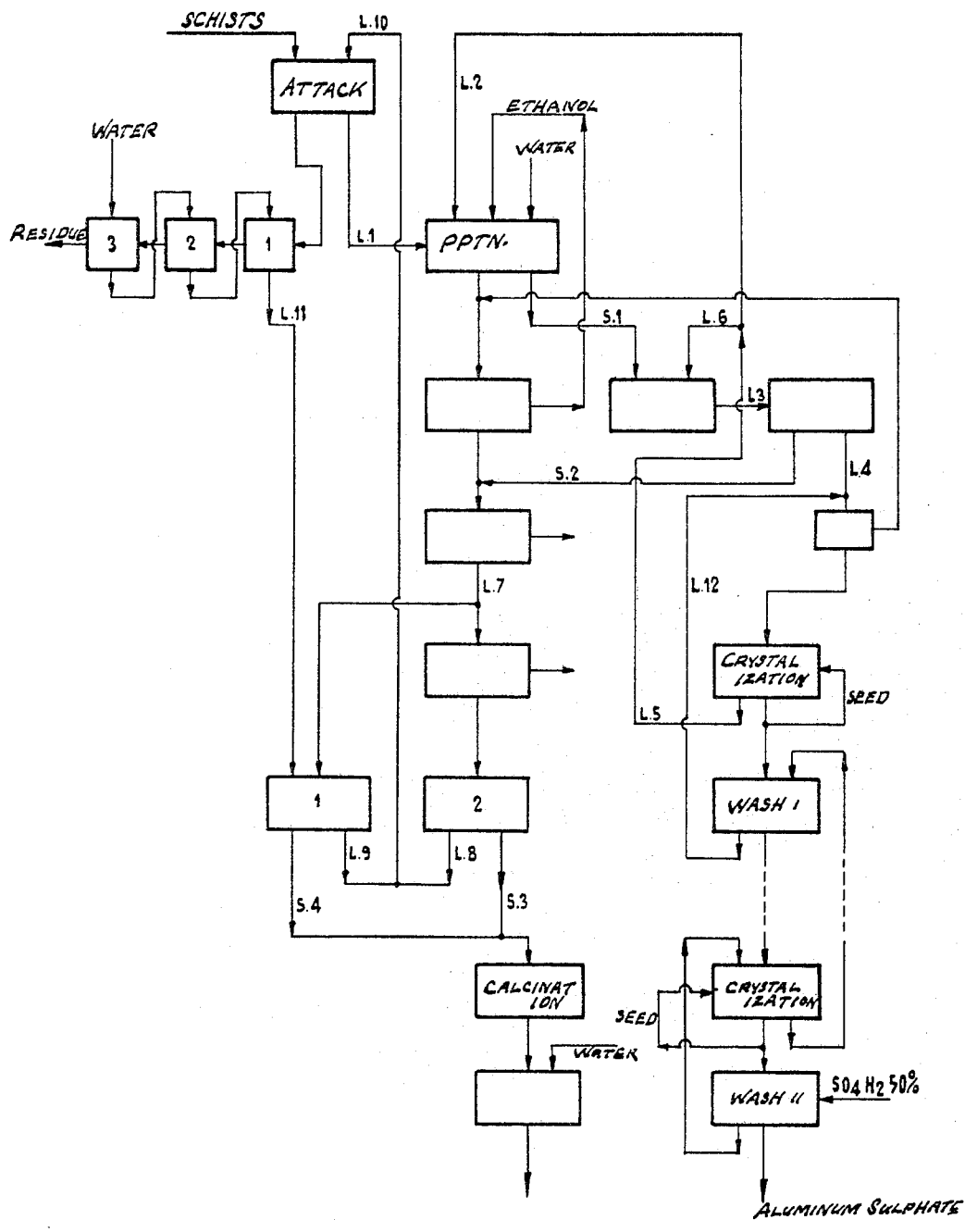

This invention relates to a process for treating coal schists with a view towards preparing pure aluminum sulphate and recovering other minerals in an industrially usable form, the most plentiful of which are iron and potassium.

Such schists are coal extraction residues which are so low in carbon as to be incapable of use as fuels and of little commercial value. Although their composition varies with their origin, such schists usually contain a large quantity of aluminum, usually combined in the form of hydrosilicates. In addition, they contain free silica and combined silica, iron, alkali metals, alkaline earth metals and traces of many other elements. In general, after removal of water and the other carbonaceous products by calcination, such schists contain 55% to 60% of silica, 20% to 30% of alumina, 5% to 10% of ferric oxide, 4% to 5% of potassium oxide and 0.5% to 1.5% of sodium oxide as principal constituents.

The problem of extracting the alumina present in coal schists has prompted extensive research. The main difficulty is centered around the presence of iron and potassium which not only have to be completely removed from the alumina but also should be recovered in a commercially usable form to make the process economically feasible.

Among the methods previously described for the preparation of alumina by the acid technique, use has been made of sulphuric acid to form the crude aluminum sulphate solution from which the alumina has been precipitated by alcohol. Although the results obtained by the authors were excellent, they cannot be industrially reproduced because the elimination of impurities remained as a major problem. It is readily possible, in the course of a single operation, to separate aluminum sulphate of satisfactory purity by crystallization because the impurities remain in the mother liquors. However, in practice, the mother liquors must, of necessity, be recycled indefinitely, with the result that they become more and more laden with soluble impurities, completely to change the parameters of the problem.

The straight forward solutions applicable to an isolated cycle have not been reduced to commercial practice. To have industrial value, the process must include, after a certain number of equilibrium-establishing cycles, a continuous cycle during which all the constituents present in the batch of ore are withdrawn at various points of the circuit, firstly in the form of pure aluminum sulphate, secondly in the form of generally useless residues, such as silica, and finally in the form of industrially usable products such as iron oxide, and salts of potassium.

It has not been possible, with any of the conventional processes, to arrive at a solution to this problem, and it is the object of the present invention to accomplish same.

This and other objects and advantages of this invention will hereinafter appear and for purposes of illustration, but not of limitation, embodiments of this invention are shown in the accompanying drawings, in which—

Figure 2:
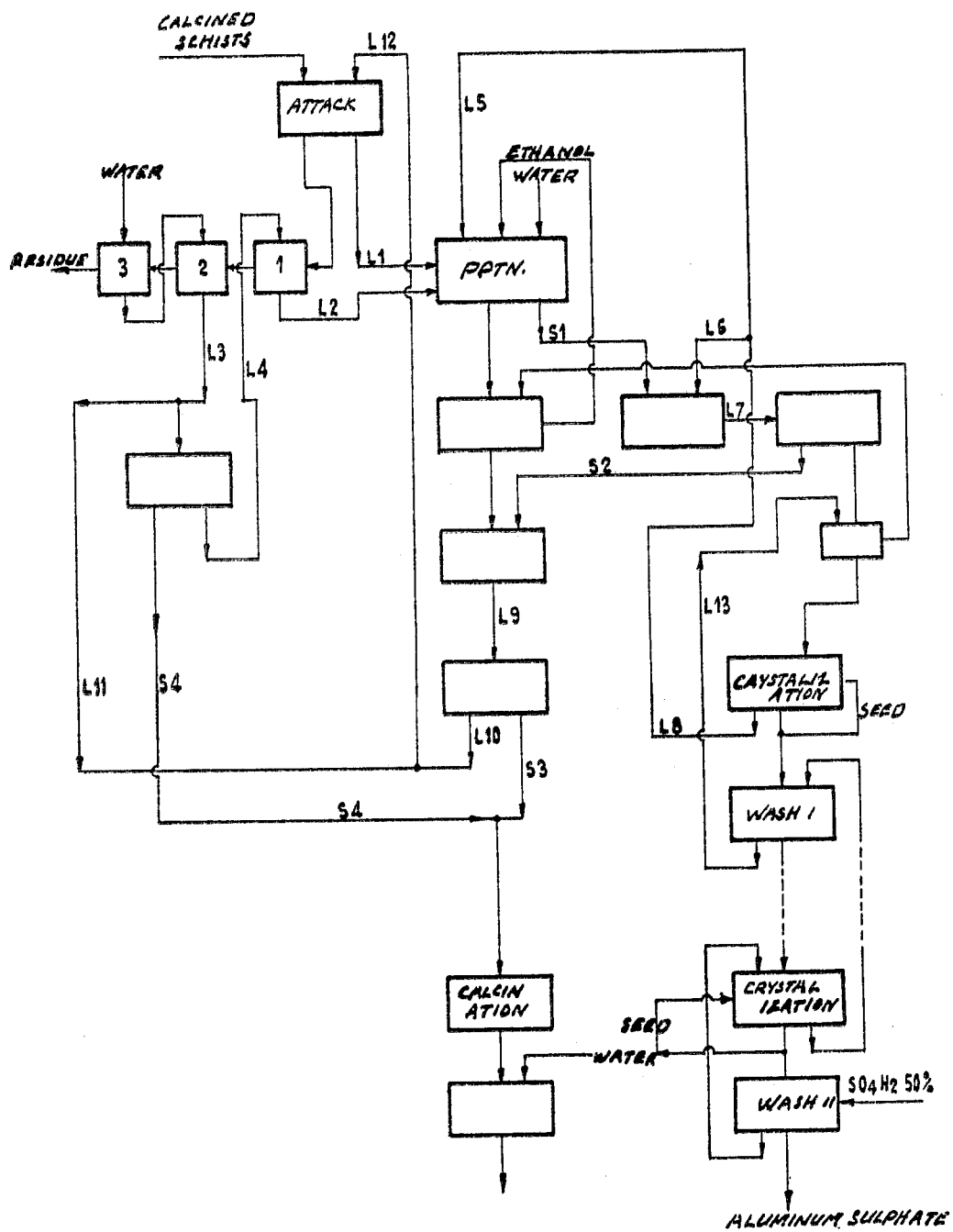

FIG. 1 is a flow diagram of a process embodying the features of this invention in which the iron is in bivalent form; and FIG. 2 is a flow diagram showing a modification of the process embodying the features of this invention in which the iron is in the trivalent form.

The process of this invention comprises a continuous treatment cycle for schist, characterized by (1) the type of reactions used, (2) the composition of the liquids in circulation, and (3) the location of the outlets, for the residual, intermedite or end products. Schematically, the process comprises crushing or grinding the schist and optionally calcining it and subjecting the resulting product to the action of an excess of hot, concentrated aqueous sulphuric acid solution which will be impure because it is essentially a recycled solution laden with alumina, iron and alkali metals. The solid phase is then separated and washed with water to isolate the insoluble components, among which silica is the major proportion. The washing waters which contain sulphuric acid and soluble sulphates are re-introduced into the cycle.

The liquid phase from the sulphuric treatment is treated with an aqueous solution of ethanol to precipitate the sulphates of aluminum, iron and potassium which are separated, as by filtration, and then dissolved at elevated temperature in a concentrated aqueous solution of sulphuric acid.

By cooling this solution it is possible to precipitate acid sulphate of potassium low in aluminum, which is reintroduced into the cycle. Aluminum sulphate low in potassium is crystallized from the mother liquors and then purified by a series of crystallizations a televated temperature in approximately 50% sulphuric acid.

The alcohol present in the filtrate is recovered by distillation and used to dissolve the acid sulphate of potassium which is concentrated by evaporation. By cooling the latter solution it is possible to precipitate a mixture of iron sulphate and potassium sulphate which is separated by filtration from the sulphuric solution which is reused to treat the calcined schists. The mixtures of impure iron sulphate and potassium sulphates isolated from the cycle at two different points, are combined, calcined and washed to separate the iron as the oxide and the potassium as the sulphate. During calcination of the sulphates, the sulphuric acid, combined in the form of iron sulphate, is recovered.

It is possible by the process of this invention to recover approximately 90% of the aluminum present in the schist in the form of the sulphate: $Al_2(SO_4)_3 \cdot 5H_2O$, approximately 90% of the iron in the form of the oxide, containing less than 4% of alumina, and almost 95% of the potassium in the form of the sulphate.

The various stages of the process are linked with one another. After a period of transition, an equilibirum is reached which is subject to very little change and the quantity of products removed at certain points of the circuit, namely, aluminum sulphate, alkaline sulphates, iron oxide, silica, are equivalent to ore, sulphuric acid, water and the like introduced.

The composition of the solutions in circulation is governed by the degree of oxidation of the iron present in the ore with only very slight modification from case to case, as can be seen from the following two extreme cases: one concerns the treatment of a crude schist in which all the iron is in the ferrous state (FeO), and the other the treatment of a schist in which all the iron has been oxidized by calcination to the ferric form ($Fe_2O_3$).

The process illustrated in FIG. 1 is concerned with a schist in which all the iron is in the bivalent form.

Having been size-reduced, the crude schist is introduced into a treatment vessel into which there is also introduced an aqueous sulphuric acid solution L10 containing 600 to 900 g. and preferably around 800 g. of $SO_3$ per liter. As it is essentially a recycle solution, it also contains 10 to 20 g. of $Al_2O_3$, 3 to 5 g. of Feo, 10 to 20 g. of $Na_2O$ and 30 to 60 g. of $K_2O$ per liter. The schist is treated with the acid solution in a quantity of 200 to 300 kg. per cubic meter. In order to ensure as complete a reaction as possible, the reaction is carried out with stirring for a period of between 1 and 5 hours at the temperature at which the liquid boils and at atmospheric pressure.

Upon completion of the reaction, the aluminum sulphate remains in solution in the acid which then contains 45 to 75 g./liter of alumina. Part of the iron and of the potassium also enters into solution in sulphate form while another portion of iron and potassium is trapped in the sludgy residue of the reaction. The liquid phase L1 is separated from the solid phase as by decantation, centrifuging, filtration or by any other method known per se.

(A) The solid phase is advanced to a series of washing tanks 1, 2 and 3, for extraction with water in countercurrent flow. The insoluble residues, which consist essentially of silica and contain only a small quantity of alumina, iron and alkali metals are discarded. The carbonaceous products present in the crude schist and other elements present in it in small proportions are eliminated with the residues.

The sulphates of iron, potassium and aluminum which were present in the liquid with which the residues were impregnated, are contained by the stream of water. The treatment of these washing waters L11 will hereinafter be described.

(B) After the schist has been treated, the liquid phase L1 is mixed with a solution L2, which is rich both in alumina and in sulphuric acid, and which consists of some of the mother liquors emanating from the initial crystallization of the aluminum sulphate. In order to crystallize this mixture, an aqueous solution of ethanol is added, followed by prolonged stirring at around 30° C. A mixture of aluminum and potassium sulphates, containing a little iron and sodium, is precipitated. The precipitates are separated, as by filtration, from the water-alcohol mother liquors and then dissolved at around 80° C. in the solution L6 having the same composition as L2: mother liquors emanating from the initial crystallization of the aluminum sulphate. The addition of this liquid rich in sulphuric acid gives a liquor L3 which, upon cooling to around 45° C., precipitates the acid sulphate of potassium S2 containing very little aluminum. It is separated from the mother liquors L4 to which the waters L12, used to wash the crystals of the initial crystallization of the aluminum sulphate, are added. After some of the water has been removed by evaporation, the liquid is cooled to around 45° C. and the aluminum sulphate is crystallized by the introduction of a seed emanating from a previous operation. The crystals, suction-filtered and washed with the filtrate from the following crystallization have essentially the following composition:

$$Al_2(SO_4)_3 \cdot 0.5H_2SO_4 \cdot 11-12H_2O$$

and still contain small quantities of impurities.

These crystals are dissolved in the washing liquid from the following crystallization. By following this procedure, it is possible to convert the acid salt, containing 12 molecules of water, into a neutral sulphate containing between 5.5 and 6 molecules of water, using the method described in the copending application Ser. No. 465,395, filed June 21, 1965, entitled "Process for the Preparation of Crystallized Neutral Aluminum Sulphates Having Low Water Content." This process comprises crystallizing an acid solution of aluminum sulphate whose sulphuric acid, water and alumina content is within well defined limits, at temperatures of from 105° to 140° C. After washing with a 50% solution of sulphuric acid and then if desired with a small quantity of water, an almost pure neutral salt is secured. It is, however, possible further to improve purification by subjecting the salt to one or more successive additional crystallizations, as shown on the flow sheet. The quantity of aluminum converted to the pure sulphate amounts to some 90% of the aluminum present in the schist. The sulphuric acid introduced into the cycle for washing the crystals corresponds to the losses of sulphuric acid due, above all, to the extraction both of the aluminum and of the alkali metals in the form of sulphates.

Treatment of the separated liquid phase following precipitation with ethanol, initially comprises recovering the alcohol present in this filtrate by distillation. The alcohol is returned to the circuit where it is used to precipitate the mixture L1–L2. There is hardly any loss of alcohol.

The hot alcohol-free solution has the crystals S2 of acid potassium sulphate added to it, after which it is concentrated by evaporation until its total $SO_3$ content is between 750 and 950 g. and preferably between 800 and 850 g./liter. The liquid L7 is then subdivided into two portions: About one-quarter is concentrated by evaporation until the temperature at which the liquid boils under atmospheric pressure reaches approximately 180° C., after which it is cooled to 60° C., the sulphates rich in both iron and in alkali metals being precipitated by prolonged stirring at this temperature. Precipitation can be accelerated by the introduction of a seed crystal emanating from a previous operation. The sulphate crystals S3 are separated from the liquid L8 of high sulphuric acid content. The rest of the solution L7 is mixed with the solution L11 used to wash the residues. This mixture is concentrated until the temperature of the boiling liquid under atmospheric pressure is around 140° C., after which it is cooled with stirring to around 45° C. for a few hours to crystallize a sulphate mixture S4 which is separated, as by filtration, from the mother liquors L9. The mixture of the mother liquors L8 and L9 reconstitutes the sulphuric mixture L10 which is returned to the circuit to act upon a fresh batch of ore. The salt crystallization may be accelerated by the introduction of a seed crystal emanating from a previous operation.

The crystals S3 are mixed with the crystals S4. Total dissociation of the iron sulphate and partial dissociation of the aluminum sulphate is brough about by calcination. The acid corresponding to the dissociated sulphates is recovered in the form of a mixture of $SO_3$ and $SO_2$. The undissociated sulphates are separated from the oxides by washing with water. Pure potassium sulphate is obtained by filtration, from the mother liquors L9. The mixture of oxide, containing not more than 5% by weight of alumina, may be directly used in preparation of iron in a blast furnace.

Example

A crude, size-reduced schist having the following composition by weight is used as the starting material:

| | | |
|---|---|---|
| $Al_2O_3$ | percent | 22.9 |
| FeO | do | 4.5 |
| $SiO_2$ | do | 46.9 |
| $Na_2O$ | do | 0.68 |
| $K_2O$ | do | 4.07 |
| Remainder | percent most | 20.95 | of which is formed by carbonaceous products and moisture. 1.25 tons of schist were treated for 4 hours at boiling temperature and atmospheric pressure in a stirrer-equipped tank, with 5.35 m.³ of solution L10 having a composition per cubic meter as follows: 810 kg. of $SO_3$, 14 kg. of $Al_2O_3$, 3.3 kg. of FeO, 16.7 kg. of $Na_2O$ and 45.6 kg. of $K_2O$.

After filtration, 4.65 m.³ of solution L1 are obtained, having the following composition per cubic meter: 780 kg. of $SO_3$, 60.5 kg. of $Al_2O_3$, 11 kg. of FeO, 17.6 kg. of $Na_2O$ and 47 kg. of $K_2O$. The residues, impregnated with liquid, are treated in countercurrent flow with 2.5 m.³ of water in a three-stage washer 1, 2, 3. The washed residues, which are discarded, contain 765 kg. of dry materials of which 73.6% consist of $SiO_2$, 3.9% of $Al_2O_3$, 0.45% of FeO, 0.16% of $Na_2O$ and 0.7% of $K_2O$, the remainder consisting of carbonaceous products and very small quantities of various elements.

The washing liquid L11 has a volume of 2.8 m.³ and the following composition per cubic meter: 246 kg. of $SO_3$, 17.9 kg. of $Al_2O_3$, 6.8 kg. of FeO, 5.2 kg. of $Na_2O$, and 25.3 kg. of $K_2O$. The treatment of this liquid will hereinafter be described.

The liquid phase L1, separated after the schist has been treated, is 4.65 m.³. It is delivered into a precipitation tank where it is mixed with 1.6 m.³ of solution L2 which is a fraction of the mother liquors emanating from the first crystallization of the aluminum sulphate.

These mother liquors have the following composition per cubic meter: 620 kg. of $SO_3$, 20 kg. of $Al_2O_3$, 2.2 kg. of FeO, 15.9 kg. of $Na_2O$, 19.2 kg. of $K_2O$.

An aqueous solution of ethanol, containing 12.25 m.³ of pure ethanol, is added to this mixture to precipitate most of the salts. After prolonged stirring at 30° C., 3.905 tons of crystals S1 are separated by filtration having a composition as follows: 27.2% of $SO_3$, 7.3% of $Al_2O_3$, 0.1% of FeO, 0.7% of $Na_2O$ and 6.2% of $K_2O$. The crystals show a marked degree of hydration and, in addition, retain a considerable proportion of the mother liquors by capillary action.

These crystals are dissolved at 80° C. in 7.4 m.³ of liquid L6 consisting of the rest of the mother liquors emanating from the initial crystallization of the aluminum sulphate, having a composition which is the same as that of L2 indicated above. Upon cooling to around 45° C., this highly acid solution precipitates acid potassium sulphate crystals containing a very small amount of aluminum. Stirring for one hour at 45° C. is followed by filtration and separation of 740 kg. of crystals $S_2$ containing 54.6% of $SO_3$, 28.9% of $K_2O$, 0.5% of $Al_2O_3$, 0.05% of FeO, and 9.6 m.³ of filtrate L4 containing per cubic meter 547 kg. of $SO_3$, 44.7 kg. of $Al_2O_3$, 15 kg. of $Na_2O$, 17.9 kg. of $K_2O$, 2.06 kg. of FeO. It is from this liquid L4 that the aluminum sulphate is crystallized.

For this purpose, it is mixed with 1.75 m.³ of the liquid L12 used to wash the crystals from the initial crystallization of the aluminum sulphate, after which the mixture is concentrated by evaporation until the temperature of the boiling liquid at atmospheric pressure reaches 130° C. The alcohol recovered during concentration is introduced into the water-alcohol filtrate separated from the crystals S1.

The concentrated liquid is cooled to 45° C. with stirring and precipitation is initiated with one ton of seed crystals emanating from a previous operation. After an interval of 10 hours, aluminum sulphate crystals are separated and washed with the mother liquors from the following crystallization. Their composition corresponds to the formula:

$$Al(SO_4)_3 \cdot 0.5\ H_2SO_4 \cdot 11\text{–}12H_2O$$

A quantity of one ton, corresponding to the weight of the seed batch, is removed to be used for the same purpose. These crystals are then subjected to crystallization several times in succession in a hot acid medium by the process described in the previously described copending application Ser. No. 465,395, the mother liquors from the crystallization ($n+1$) being used on each occasion to wash the crystals obtained by crystallization $n$ and the washing liquors of the crystals $n$ being used to dissolve the crystals from the following crystallization $n$.

The resulting crystals are washed with 1.75 m.³ of 50% sulphuric acid and then with a small quantity of ice water 1.1 tons of aluminum sulphate $$Al_2(CO_4)_3 \cdot 5.5\text{–}6H_2O$$

are finally obtained.

Accordingly, 250 kg. of alumina are isolated in neutral sulphate form, free of iron and alkali metals, from the 286 kg. present in the treated ore.

The 9 m.³ of mother liquors L5 recovered by filtration after the first crystallization of the sulphate, are used as previously explained: 1.6 m.³ (L2) are mixed with the solution L1 and the remaining 7.4 m.³ used to dissolve the crystals S1 precipitated with the alcohol.

The alcohol recovered during concentration of the mother liquors emanating from the first crystallization of the aluminum sulphate is added to the water-alcohol filtrate separated from the crystals S1. The mixture is then heated in an apparatus equipped with a tray column which enables substantially all the ethanol used in the cycle to be recovered. The acid potassium sulphate S2 is then dissolved in the alcohol-free liquid and the solution concentrated by evaporation until its volume is reduced to 4.875 m.³. The liquid L7 thus obtained contains per cubic meter: 810 kg. of $SO_3$, 6.5 kg. of $Al_2O_3$, 10.4 kg. of FeO, 16.8 kg. of $Na_2O$, 45 kg. of $K_2O$.

1.3 m.³ of this solution are removed and the solution concentrated until the temperature of the boiling liquid at atmospheric pressure reaches 180° C., after which it is cooled to 60° C. 30 kg. of crystals from a previous step are then added to promote crystallization. After some 10 hours of stirring at 45° C., the product is filtered to separate the crystallized sulphates, quantity of 30 kg. being removed to be used as seed crystals for a subsequent operation, and 200 kg. of crystals S3 are obtained, their composition being as follows: 59.5% of $SO_3$, 0.7% of $Al_2O_3$, 5.9% of FeO, 3.2% of $Na_2O$ and 4% of $K_2O$. The filtrate L8 has a volume of 0.8 m.³ and the following composition per cubic meter: 1170 kg. of $SO_3$, 8.9 kg. of $Al_2O_3$, 2.2 kg. of FeO, 19.4 kg. of $Na_2O$ and 63 kg. of $K_2O$.

The rest of the solution L7, i.e. 3.575 m.³, is mixed with 2.8 m.³ of the solution L11 used to wash the residues. This mixture is concentrated until the temperature of the boiling liquid at normal pressure is around 140° C., after which it is cooled with stirring for a few hours to 45° C. in order to crystalize some of the salts. 370 kg. of crystals S4 are thus separated, containing: 50% of $SO_3$, 1.5% of $Al_2O_3$, 10.9% of FeO, 0.2% of $Na_2O$ and 10.3% of $K_2O$, and 4.5 m.³ of filtrate L9 containing per cubic meter; 755 kg. of $SO_3$, 15.1 kg. of $Al_2O_3$, 3.5 kg. of FeO, 16.7 kg. of $Na_2O$ and 43 kg. of $K_2O$.

The liquids L8 and L9 are mixed to form the treating or attacking liquid L10. The residues S3 and S4 are mixed. 570 kg. of a mixture of sulphates are thus obtained, containing: 304 kg. of $SO_3$, 6.9 kg. of $Al_2O_3$, 52 kg. of FeO, 71 kg. of $Na_2O$, 46.2 kg. of $K_2O$, as well as water of crystallization and impregnation. These crystals are subjected to calcination so that all the ferrous sulphate is oxidized and dissociated into ferric oxide, accompanied by the dissociation of aproximately half of the aluminum sulphate. The mixture of sulphuric and sulphurous anhydrides formed during dissociation is recovered and converted into sulphuric acid. The calcination residue is washed in countercurrent flow enabling 55 kg. of oxide containing 95% by weight of ferric oxide to be isolated. It can be directly used in preparation of iron in a blast furnace. Pure potassium sulphate is obtained by fractional crystallization of the solution of sulphates, in a quantity corresponding to 43 kg. of $K_2O$.

The process shown in FIG. 2 relates to a schist in which all the iron is oxidized by calcination to the trivalent form.

The size-reduced schist is calcined in an oxidizing atmosphere at temperatures between 500° and 900° C. This operation is economic since the starting material usually contains carbon sufficient to obviate the need for added fuel after the reaction has been initiated. The reaction itself is carried out in the presence of the stream of air passed through the mass being treated. The operation may be carried out continuously in tubular furnaces. If necessary, heat recuperators may be used to preheat the air used for calcination.

The calcinated schist is introduced into a treatment tank into which there is also introduced an aqueous solution (L12) of sulphuric acid containing between 500 and 900 g., and preferably 700 g. of $SO_3$ per liter. Since it is essentially a recycle solution, the solution will also contain 5 to 10 g. of $Al_2O_3$, 3 to 5 g. of $Fe_2O_3$, 10 to 15 g. of $Na_2O$ and 15 to 20 g. of $K_2O$ per liter. The calcined schist is treated with the attacking solution in an amount of 200 to 300 kg. per cubic meter. The reaction is carried out with stirring over a period of between 1 and 4 hours, at the temperature at which the liquid boils and under atmospheric pressure in order to ensure as complete a reaction as possible.

The relative quantities of ore, water and sulphuric acid are chosen so that, upon completion of treatment, all the aluminum sulphate remains in solution in the acid which thus contains between 45 and 75 g. of alumina per liter. A little iron sulphate and a little potassium sulphate also enter into solution, although the greater part of these two metals remain as solids in the treatment residue. In this way, most of the iron and potassium present in the ore can be more easily separated from the alumina than in the case of crude schists.

The liquid phase L1 is then separated from the solid phase, as by decantation, centrifuging, filtration, or by any other method known per se.

(A) The solid phase then passes into a group of washing tanks 1, 2 and 3 where it is methodically extracted with water in countercurrent flow. The insoluble residue, which consist essentially of silica, and contain only a very small quantity of unattachable silico-aluminates, are discarded. Other elements contained in small quanties in the schist are eliminated with the residues.

On the other hand, the sulphates of iron and potassium are dissolved by the stream of water. The washing liquor L3 is removed at a point 2 from the circuit and concentrated by evaporation until the temperature of the boiling liquid at atmospheric pressure reaches 110–115° C. When cooled, crystals S4 precipitate consisting mainly of iron and potassium sulphates and of a small quantity of aluminum sulphate and sodium. These crystals are isolated, by filtration, and their treatment will hereinafter be described.

The filtrate L4 returns to the washing circuit at point 1 where it is used to displace the liquid entrained with the residues when they enter the first washer.

A modification of this washing treatment comprises removing only a fraction of the washing water L3 at 2 for concentration while returning the remainder L11 into the treatment liquid L12 in order to stabilize its composition.

(B) The liquid phase L1, separated after treatment of the schist, is mixed with the residue wash waters L2. A solution L5, rich both in alumina and in sulphuric acid, and which consists of some of the mother liquors of the first crystallization of the aluminum sulphate, is then added. In order to crystallize this mixture of solutions L1, L2, L5, an aqueous solution of ethanol is added, and the resultnig mixture is stirred slowly at around 30° C. A mixture of aluminum and potassium sulphates, containing a small amount of iron and sodium, is precipitated. The precipitates are separated, as by filtration from the water-alcohol mother liquors, the treatment of which will hereinafter be described, and then dissolved at around 80° C. in the solution L6 having the same composition as the L5 mother liquors emanating from the initial aluminum sulphate crystallization. The addition of this liquid rich in sulphuric acid yields a liquor L7 which, when cooled to around 45° C., precipitates the acid sulphate of potassium S2 substantially free of aluminum. It is separated from the mother liquors to which are added to wash waters L13 used to wash the crystals emanating from the first aluminum sulphate crystallization. After some of the water has been removed by evaporation, the liquid is cooled to around 45° C. to crystallize aluminum sulphate with the introduction of a seed crystal emanating from a previous operation. The crystals, which are filtered by suction and then washed with the filtrate from the subsequent crystallization, have essentially the following composition:

$$Al_2(SO_4)_3 \cdot \tfrac{1}{2} H_2SO_4 \cdot 11\text{–}12H_2O$$

plus a small amount of impurities.

These crystals are dissolved in the washing liquid from the subsequent crystallization. It is possible by following this procedure to convert the acid salt containing 5.5 to 6 mols of water, using the method described in the aforementioned copending application Ser. No. 465,395, relating to a process for crystallizing an acid solution of aluminum sulphate whose sulphuric acid, water and alumina content is within well defined limits, at temperatures of from 105–140° C. After washing with a 50% sulphuric acid solution and then, if desired, with a little water, an almost pure neutral salt is secured. It is, however, also possible further to improve purification by subjecting the salt to one or more additional successive crystallizations, as shown on the flow sheet.

The quantity of aluminum converted into pure sulphate amounts to about 90% of the aluminum present in the schist. The sulphuric acid introduced into the cycle to wash the crystals compensates for the amount of sulphuric acid lost due above all to extraction both of the aluminum and of the alkali metals in sulphate form.

The alcohol is recovered from the liquid phase separated after precipitation with ethanol initially by distillation. The alcohol is returned to the circuit where it is used to precipitate the mixture L1, L2, L5. Thus, there is hardly any loss of alcohol. The hot alcohol-free solution has the acid potassium sulphate crystals S2 added to it, after which it is concentrated by evaporation until its total $SO_3$ content reaches 750 to 950 g./liter and preferably 850 g./liter. This liquid is then cooled to between 30° and 60° C. and preferably to 45° C. and stirred for several hours in the presence of seed crystals emanating from a previous operation. A mixture S3 of metal sulphates, low in alumina and rich in iron and potassium is precipitated. The filtrate L10 is returned to the circuit to be used as the treatment or attacking liquid for the ore.

The crystals S3 are mixed with the crystals S4 separated in the treatment of the residues from the initial leaching step. Total dissociation of the iron sulphate and partial decomposition of the aluminum sulphate is brought about by controlled calcination. The acid, corresponding to the dissociated sulphates, is recovered in the form of a mixture of $SO_3$ and $SO_2$. The non-dissociated sulphates are separated from the oxides by washing with water. The pure potassium sulphate is separated by fractional crystallization from the solution. The iron oxide containing, at most, 5% by weight of alumina may be used directly in preparation of iron in a blast furnace.

Example

The following example illustrates the invention in the case of a particular type of coal schist. The example is not intended to be in any way limiting. A process of separate successive operations is described for purposes of clarity but, in practice, all the operations can be carried out simultaneously in a continuous operation.

The starting material is a size-reduced coal schist calcined at around 700° C., having the follownig composition in parts by weight:

| | Percent |
|---|---|
| $Al_2O_3$ | 24.8 |
| $Fe_2O$ | 7.1 |
| $SiO_2$ | 57.6 |
| $Na_2O$ | 0.81 |
| $K_2O$ | 4.2 |
| Miscellaneous | 5.5 |

1.76 tons of schist are treated for two hours at atmospheric pressure in a stirrer-equipped tank, with 7.6 m.³ of a boiling sulphuric solution having the following composition: $SO_3$ 754 kg./m.³, $Al_2O_3$ 8.2 kg./m.³, $Fe_2O$ 4.3 kg./m.³, $Na_2O$ 13.8 kg./m.³, $K_2O$ 16.6 kg./m.³.

Following filtration, 5.8 m.³ of solution L1 are obtained, containing per cubic meter: 712 kg. of $SO_3$, 63 kg. of $Al_2O_3$, 1.8 kg. of $Fe_2O$, 15.5 kg. of $Na_2O$ and 15.5 kg. of $K_2O$. The residues, impregnated with liquid, are washed in countercurrent with 5.3 m.³ of water in three washing tanks 1, 2 and 3. The residues, discarded after washing, contain 1.1 tons of dry material, i.e., 62.5% of the weight of the ore. Analysis of this dry material shows that it contains 2.1% of $Al_2O_3$, 1.3% of $Fe_2O_3$, 0.14% of $Na_2O$, 0.41% of $K_2O$, 9% of $SiO_2$, miscellaneous 5%.

The liquid L3 issuing from the second washer has a volume of 5.4 m.³, has a composition per cubic meter as follows: 193 kg. of $SO_3$, 18.7 kg. of $Al_2O_3$, 26 kg. of $Fe_2O_3$, 4 kg. of $Na_2O$ and 20 kg. of $K_2O$.

1.2 m.³ (L11) of the liquid are directly returned to the treatment tank and the remainder (L4), i.e. 4.2 m.³, is concentrated by evaporation until its boiling point reaches 112° C. This corresponds to a reduction in volume to one-third of its original volume. By holding this temperature for 3 hours, a mixture of sulphates S4 is precipitated and separated by filtration. The crystals weigh 710 kg. and contain 51.7% of $SO_3$, 0.9% of $Al_2O_3$, 12.6% of $Fe_2O_3$, 1.2% of $Na_2O$, 7.7% of $K_2O$, the rest being made up of water or hydration. The filtrate L4 has a volume of 1.7 m.³ and the following composition per cubic meter: 260.6 kg. of $SO_3$, 42.3 kg. of $Al_2O_3$, 11.6 kg. of $Fe_2O_3$, 4.9 kg. of $Na_2O$, 17.35 kg. of $K_2O$.

The filtrate is returned to the first tank where the residues left after treatment are washed for the first time by displacing the liquid with which they are impregnated. 1.67 m.³ of liquid L2 issued from this first tank, having the following composition per cubic meter: 595 kg. of $SO_3$, 50.5 kg. of $Al_2O_3$, 7.06 kg. of $Fe_2O_3$, 8.74 kg. of $Na_2O$, 16 kg. of $K_2O$. The liquid L2 is mixed with 5.8 m.³ of liquid L1, whose composition has previously been given, and with 4.2 m.³ of liquid L5 consisting of a fraction of the mother liquors L8 emanating from the first crystallization of the aluminum sulphate. The liquid L5 has the following composition per cubic meter: 615 kg. of $SO_3$, 21.5 kg. of $Al_2O_3$, 19 kg. of $Fe_2O_3$, 8.9 kg. of $Na_2O$, 10.9 kg. of $K_2O$.

These 11.67 m.³ of liquid are combined in a stirrer-equipped tank and cooled to 30° C. An aqueous solution containing 20.5 m.³ of ethanol is added to this mixture to precipitate most of the salts present. 7.63 tons of crystals S1 are then separated, as by filtration or centrifuging, their composition being as follows: 28% of $SO_3$, 6.5% of $Al_2O_3$, 0.1% of $Fe_2O_3$, 0.5% of $Na_2O$, 1.9% of $K_2O$.

In addition, these crystals contain water and alcohol of crystallization. They are dissolved at a temperature of about 80° C. in 15.3 m.³ of the solution L6 formed of a fraction of the mother liquors L8 from the first crystallization of the aluminum sulphate having a composition which is the same as that of the liquid L5. The mixture is cooled to 45° C. and stirred at this temperature for 1 hour to precipitate 220 kg. of the acid sulphate of potassium S2 which is separated by filtration and which has the following composition: $Al_2O_3$ 0.5%; $K_2O$ 30.1%; $SO_3$ 55%.

The mother liquors have a volume of 20 m.³ and the following composition per cubic meter:

571 kg. $SO_3$, 41 kg. of $Al_2O_3$, 18.5 kg. of $K_2O$, 8.6 kg. $Na_2O$. It is from these mother liquors that the aluminum sulphate is crystallized.

After they have been mixed with the waters L13 used to wash the crystals from the first crystallization of the aluminum sulphate, they are concentrated by evaporation at normal pressure until the temperature of the boiling liquid reaches 130° C. The initial fractions contain alcohol and are introduced into the water-alcohol filtrate separated from the crystals S1. The concentrated liquid is cooled while stirring to 45° C. After an interval of a few hours, 1.5 tons of crystallized sulphate from a subsequent operation are added with a view towards initiating precipitation. Upon completion of precipitation, the mother liquors L8, having a volume of 19.5 m.³ and the composition previously described, together with crystals which are washed with the mother liquor from the subsequent crystallization, are separated by filtration. They correspond substantially to the formula:

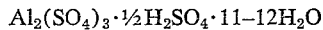

$$Al_2(SO_4)_3 \cdot \tfrac{1}{2}H_2SO_4 \cdot 11-12H_2O$$

A quantity of 1.5 tons of these crystals, corresponding to the seed batch added, is separated to be re-used for the same seeding purpose. The rest of the crystals are subjected to several successive crystallizations at elevated temperature in an acid medium using the process described in the aforementioned application Ser. No. 465,395, the mother liquors from the crystallization ($n+1$) being used on each occasion to wash the crystals obtained during crystallization $n$ and the liquors used to wash the crystals $n$ being used to dissolve the crystals emanating from the subsequent crystallization $n$.

These crystals are washed with a 50% sulphuric acid solution and then with a very small quantity of ice water. 1.75 tons of the sulphate $Al_2(SO_4)_3 \cdot 5.5H_2O$ free of iron and alkali metals are finally obtained.

The initial fractions emanating from the distillation of the mother liquors of the first crystallization of the aluminum sulphate are added to the water-alcohol filtrate L14 separated from the crystals S1. The mixture is then heated in a tower equipped with a tray column, enabling all the ethanol combined in the circuit to be recovered. The acid potassium sulphate S2 is then dissolved in the residue which is concentrated until the temperature reaches 155° C. at normal pressure. 6.75 m.³ of liquor L9 are thus obtained containing per cubic meter: 7 kg. of $Al_2O_3$, 3.3 kg. of $Fe_2O_3$, 15.5 kg. of $Na_2O$, 17.3 kg. of $K_2O$, 842 kg. of $SO_3$. This liquid is cooled to 45° C. and held at this temperature for several hours. Precipitation is accelerated if it is initiated with approximately 10 kg. of crystals emanating from the preceding operation. The crystals are separated by suction-filtration and, if desired, a quantity is removed equal in weight to the quantity of seed crystals S3 added. 300 kg. of crystals S3 are obtained, having the following composition: 1.3% of $Al_2O_3$, 7.1% of $Fe_2O_3$, 1.4% of $Na_2O$, 5% of $K_2O$, 63.0% of $SO_3$, the rest being water of crystallization.

The filtrate L10, which has a volume of 6.4 m.³, has the following composition per cubic meter: 6.8 kg. of $Al_2O_3$, 0.2 kg. of $Fe_2O_3$, 15.7 kg. of $Na_2O$, 15.9 kg. of $K_2O$ and 859.2 kg. of $SO_3$. This liquid, mixed with the waters L11 used to wash the residues, is recycled for the treatment of a new batch of calcined schist.

The crystals S3 and S4 are mixed, giving 1.1 tons of a sulphate mixture containing: 103 kg. of $Al_2O_3$, 110.7 kg. of $Fe_2O_3$, 12.7 kg. of $Na_2O$, 69.7 kg. of $K_2O$ and 566.1 kg. of $SO_3$, the rest being water of hydration.

The mixture is calcined to totally decompose the iron sulphate and approximately 50% of the aluminum sulphate. The non-dissociated sulphates are removed by washing, 116 kg. of iron oxide containing 5% of alumina being isolated. It may be used in preparation of iron in a blast furnace.

Pure potassium sulphate is isolated by fractional crystallization of the filtrate to produce an amount corresponding to 65 kg. of $K_2O$.

It will be understood that changes may be made in the details of construction, arrangement and operation without departing from the spirit of the invention, especially as defined in the following claims.

We claim:

1. A process for exploiting coal schists from which the aluminum is isolated in neutral sulphate forming the potassium in sulphate form and the iron in ferric oxide form, comprising treating the schists with an excess of hot concentrated aqueous sulphuric acid solution, separating the solid phase, treating the liquid phase with aqueous solution of ethanol to precipitate the sulphates of aluminum, iron and potassium, separating the precipitate, treating the precipitate to redissolve the sulphates in a low concentrated aqueous solution of sulphuric acid, cooling the solution to precipitate an acid sulphate of potassium low in aluminum, separating the precipitate, concentrating the filtrate to crystallize aluminum sulphate, separating the crystallized aluminum sulphate, concentrating the remaining liquor to crystallize out some of the iron and potassium sulphates, recycling the liquors to treat the schists, calcining the crystals of iron sulphate and potassium in sulphate to separate the iron in oxide form and the potassuim in sulphate form.

2. The process as claimed in claim 1 which includes the step of washing the solids separated from the treatment of the schists with hot concentrated aqueous sulphuric acid solution to isolate the insoluble fractions from the sulphates which are reintroduced into the circuit.

3. The process as claimed in claim 1 in which the sulphates of aluminum, iron and potassium are redissolved in a concentrated aqueous solution of sulphuric acid at elevated temperature.

4. The process as claimed in claim 1 which includes the steps of purifying the separated aluminum sulphate by a series of crystallization in a hot solution of approximately 50% sulphuric acid.

5. The process as claimed in claim 1 in which the schists contain iron in ferrous form.

6. The process as claimed in claim 5 in which the composition of the treating solution per cubic meter is 600 to 900 kg. of $SO_3$, 10 to 20 kg. of $Al_2O_3$, 3 to 5 kg. of $Fe_2O_3$, 10 to 20 kg. of $Na_2O$ and 30 to 60 kg. per liter.

7. The process as claimed in claim 6 in which the $SO_3$ is present in an amount corresponding to about 800 kg.

8. The process as claimed in claim 7 in which the crude schist is treated in an amount of 200 to 300 kg. per cubic meter of treatment solution.

9. The process as claimed in claim 1 in which the schists are calcined schists.

10. The process as claimed in claim 9 in which the composition of treatment of the solution per cubic meter is 500 to 900 kg. of $SO_3$, 5 to 10 kg. of $Al_2O_3$, 3 to 5 kg. of $Fe_2O_3$. 10 to 15 kg. of $Na_2O$ and 15 to 20 kg. of $K_2O$.

11. The process as claimed in claim 10 in which the $SO_3$ is present in an amount of about 700 kg. per cubic meter.

12. The process as claimed in claim 10 in which the calcined schist is treated in an amount of 200 to 300 kg. per cubic meter of treating solution.

13. The process as claimed in claim 1 in which the acid sulphate of potassium crystallized from the strongly sulphuric medium is reintroduced into the circuit by solution in the mother liquors separated from the sulphates precipitated with ethanol.

14. The process as claimed in claim 1 which includes the step of washing the calcined product with water to separate the iron oxide containing not more than 5% by weight of alumina.

15. The process as claimed in claim 1 which includes the step of washing the calcined crystals with water to isolate potassium sulphate in pure form from the filtrate by fractional crystallization.

16. In a process for the treatment of material containing 55–60% by weight silica, 20–30% by weight alumina, 5–10% by weight iron oxide, 4–5% by weight potassium oxide and 0.5–1.5% by weight sodium oxide as the possible constituents to isolate aluminum as the neutral sulphate, potassium as the sulphate and iron as the oxide, the steps of treating the material with an excess of hot concentrated aqueous sulphuric acid solution, separating the solid phase containing the silica from the liquid phase, treating the liquid phase with aqueous solution of ethanol to precipitate the sulphates of aluminum, iron and potassium, redissolving the sulphates in a concentrated aqueous solution of sulphuric acid, cooling the solution to precipitate an acid sulphate of potassium low in aluminum, separating the precipitate, concenerating the filtrate to crystallize aluminum sulphate, separating the crystallized aluminum sulphate, concentrating the remaining liquor to crystallize out some of the iron and potassium sulphates, recycling the liquors to treat the schists, calcining the crystals of iron sulphate and potassium sulphate to separate the iron in oxide form and the potassium in sulphate form.

17. The process as claimed in claim 16 in which the sulphates of aluminum, iron and potassium are redissolved in a concentrated aqueous solution of sulphuric acid at elevated temperature.

18. The process as claimed in claim 17 which includes the step of purifying the separated aluminum sulphate by a series of crystallization in a hot solution of approximately 50% sulphuric acid.

19. The process as claimed in claim 17 in which the acid sulphate of potassium crystallized from the strongly sulphuric medium is reintroduced into the circuit by solution in the mother liquors separated from the sulphates precipitated with ethanol.

20. The process as claimed in claim 17 which includes the step of calcining the mixture of the iron and potassium sulphate to dissociate the iron sulphate and partly to dissociate the aluminum sulphate.

References Cited

UNITED STATES PATENTS

| 2,402,668 | 6/1946 | Roller | 23—123 |
| 3,078,146 | 2/1963 | Savage | 23—123 |
| 3,397,951 | 8/1968 | Jamey et al. | 23—123 |

OTHER REFERENCES

G. Thomas et al., "The Canadian Journal of Chemical Engineering," vol. 38, No. 6, December 1960, pp. 220–22.

OSCAR R. VERTIZ, Primary Examiner

G. O. PETERS, Assistant Examiner

U.S. Cl. XR.

33—121, 126